United States Patent [19]

Margaritis et al.

[11] Patent Number: 5,438,501
[45] Date of Patent: Aug. 1, 1995

[54] TURN-OFF RELIEF NETWORK FOR A DIRECT VOLTAGE CONVERTER

[75] Inventors: Basile Margaritis, Paderborn-Elsen; Lothar Heinemann, Paderborn, both of Germany

[73] Assignee: ABB Patent GmbH, Mannheim, Germany

[21] Appl. No.: 238,198

[22] Filed: May 4, 1994

Related U.S. Application Data

[63] Continuation of Ser. No. 968,413, Oct. 29, 1992, abandoned.

[30] Foreign Application Priority Data

Oct. 29, 1991 [DE] Germany ............ 41 35 569.5

[51] Int. Cl.$^6$ ............................................. H02M 3/335
[52] U.S. Cl. ............................................. 363/24; 363/56
[58] Field of Search ............................ 363/24, 50, 56

[56] References Cited

U.S. PATENT DOCUMENTS

| | | | |
|---|---|---|---|
| 4,030,014 | 6/1977 | Chana et al. | 363/24 |
| 4,280,174 | 7/1981 | Sonda | 363/24 |
| 4,675,796 | 6/1987 | Gautherin et al. | 363/20 |
| 5,140,509 | 8/1992 | Murugan | 363/24 |

FOREIGN PATENT DOCUMENTS

| | | | |
|---|---|---|---|
| 2719026 | 11/1978 | Germany . | |
| 3603368 | 6/1987 | Germany . | |
| 58-69463 | 4/1983 | Japan . | |
| 1012866 | 1/1989 | Japan . | |
| 2101964 | 4/1990 | Japan . | |
| 0155470 | 6/1990 | Japan | H02M 3/280 |
| 404295273 | 10/1992 | Japan | H02M 3/28 |

OTHER PUBLICATIONS

"Electronik" 1978, No. 4, pp. 102–107.

*Primary Examiner*—Thomas M. Dougherty
*Assistant Examiner*—Adolf Berhane
*Attorney, Agent, or Firm*—Herbert L. Lerner; Laurence A. Greenberg

[57] ABSTRACT

A turn-off relief network for a direct voltage converter includes a transformer having a primary winding. At least one clocked power transistor is connected in series with the primary winding. A first series circuit connected parallel to the primary winding includes a diode and a capacitor. A second series circuit connected parallel to the capacitor includes a reversing inductor, a reversing diode for a capacitor voltage and another transistor.

6 Claims, 5 Drawing Sheets

TURN-OFF RELIEF NETWORK FOR A DIRECT VOLTAGE CONVERTER

This application is a continuation of application Ser. No. 07/968,413 filed Oct. 29, 1992 now abandoned.

The invention relates to a turn-off relief or unloading network for reducing the switching losses of one or more power transistors in a direct voltage converter.

The turn-off relief network of the invention will be explained primarily by taking a two-transistor flux (TTF) converter as an example. However, it is also logically applicable to a direct voltage converter with only one power transistor, or to converter circuits with more than two transistors. Direct voltage converters with a single power transistor are known, for instance as blocking converters or as blocking flux converters. In the blocking flux converter, the primary winding of a blocking converter transformer is connected in series with the primary winding of the flux converter transformer. The flux converter transformer transmits energy as long as the power switch is turned on. At the same time, because of the series circuit with the blocking converter transformer, the latter is magnetized. As soon as the power switch is turned off, the secondary side of the blocking converter transformer takes on the task of the further feeding of the load, since the magnetization energy of the blocking converter transformer has to be dissipated again.

A basic circuit of a TTF converter without a turn-off relief network is well-known, and is shown by J. Wütehube, for instance, as FIG. 9 on page 106, in the publication entitled ELEKTRONIK [Electronics] 1978, No. 4, pp. 102–107. Such a circuit is shown herein in FIG. 2 and is described below.

A direct voltage converter with a relief network is known from German Patent DE-PS 24 43 892. A circuit shown in FIG. 4 herein and described below can be inferred from that patent.

Another direct voltage converter circuit with a relief network is known from German Published, Non-Prosecuted Application DE 27 19 026 A1, in which a series circuit of a diode and capacitor is connected parallel to the primary winding of the converter transformer, but the reversing current flows through the power transistor. In that known configuration, in the event of a multi-transistor embodiment, a separate relief network must also be provided for each power transistor.

A two-transistor configuration with a single relief network is known from JP 2-101 964 A, in Patent Abstracts of Japan, Section E, 1990, Vol. 14, No. 312 (E-948). There, the reversing current flows through the power transistor Q1. As in all of the aforementioned circuits, the reversal in the event of short-circuiting or creep cannot be prevented.

A further, complicated and expensive circuit configuration with an auxiliary transistor, which is triggered through an auxiliary winding on the transformer, is known from JP 58-69 463 A, in Patent Abstracts of Japan, Section E, Vol. 7, 1983, No. 162 (E-187). In that circuit configuration, the direct voltage source is disadvantageously loaded by the reversing current and demagnetizing currents, or in other words pulse-shaped currents.

A circuit configuration with two power transistors and a relief network is known from German Published, Non-Prosecuted Application DE 36 03 368 A1 in which one thyristor per power transistor is provided in each relief network. The relief networks have a common choke coil. The circuit configuration is suitable only for push-pull operation, or in other words it is not suitable for the simultaneous operation of two power transistors.

With the prior art disclosed in German Published, Non-Prosecuted Application DE 27 19 026 A1 as the point of departure, it is accordingly an object of the invention to provide a turn-off relief network for a direct voltage converter, which overcomes the hereinafore-mentioned disadvantages of the heretofore-known devices of this general type.

With the foregoing and other objects in view there is provided, in accordance with the invention, a turn-off relief network for a direct voltage converter, comprising a transformer having a primary winding; at least one clocked power transistor connected in series with the primary winding; a first series circuit connected parallel to the primary winding, the first series circuit including a diode and a capacitor; and a second series circuit connected parallel to the capacitor, the second series circuit including a reversing inductor, a reversing diode for a capacitor voltage and another transistor.

In accordance with another feature of the invention, the at least one power transistor includes first and second power transistors connected in series with the primary winding in a two-transistor converter configuration of the direct voltage converter; and the second series circuit acts as a relief network being common to the first and second power transistors. The primary winding may be connected between the first and second power transistors.

In accordance with a concomitant feature of the invention, there is provided a signal transistor through which the other transistor is triggered, the signal transistor blocking triggering of the other transistor in the event of an open or short circuit, when an adjustable pulse-to-interval ratio fails to be attained.

Other features which are considered as characteristic for the invention are set forth in the appended claims.

Although the invention is illustrated and described herein as embodied in a turn-off relief network for a direct voltage converter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIGS. 6–10 are graphs showing voltage and current courses in the converter configuration of FIG. 1, in which:

FIG. 6 shows the voltage course at the reversing capacitor;

FIG. 7 shows the voltage course at the power transistors;

FIG. 8 shows the current course in the power transistors and the primary current of the transformer;

FIG. 9 shows the current course in the rectifier diode and the free-running diode; and FIG. 10 shows the current course in the decoupling diode and the reversing diode.

Figure 2:
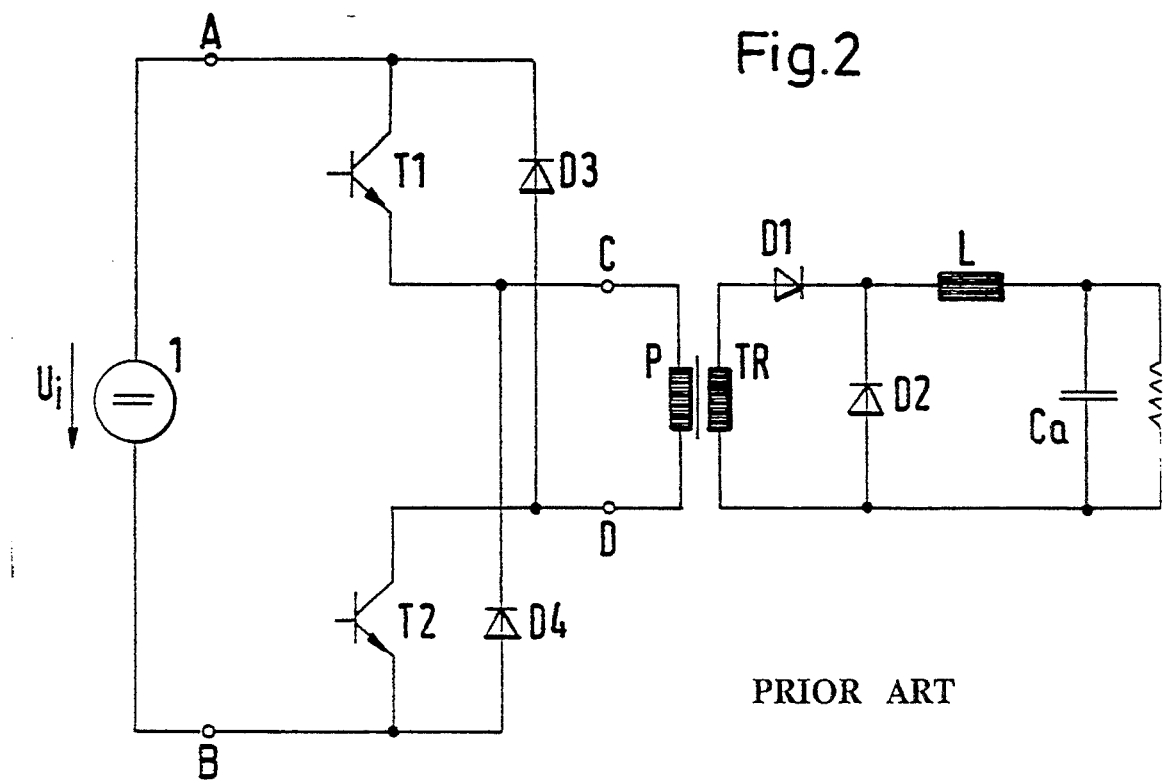
FIG. 2 is a circuit diagram of a TTF converter in accordance with the prior art (without a relief network)
Figure 9:
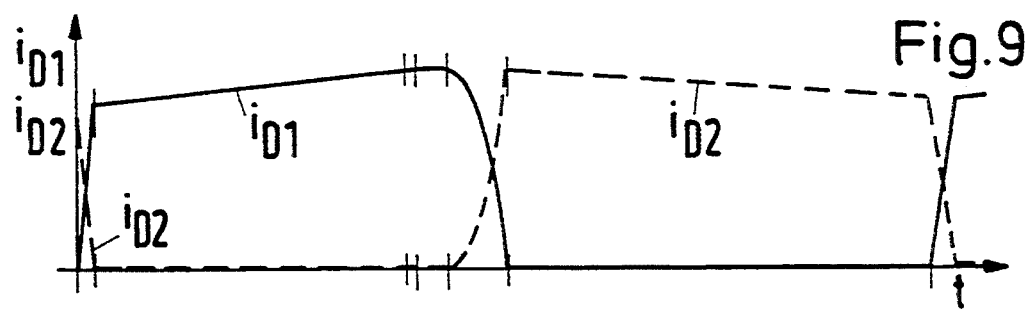

Referring now to the figures of the drawing in detail and first, particularly, to FIG. 2 thereof, there is seen a TTF converter circuit that is known from FIG. 9 on page 106 of the above-mentioned article by J. Wüstehube in the publication entitled ELEKTRONIK [Electronics] 1978, No. 4, pp. 102–107. The TTF converter has a transformer TR with a primary winding that has a first winding terminal C and a second winding terminal D. The first winding terminal C is connected through a first power transistor T1 to a first voltage terminal A of a voltage source 1. The second winding terminal D is connected through a second power transistor T2 to a second voltage terminal B of the voltage source 1. The second winding terminal D is connected through a first decoupling diode D3 to the first voltage terminal A. The first winding terminal C is connected through a second decoupling diode D4 to the second voltage terminal B. On the secondary side, the circuit has the usual configuration for an on-state converter, including a rectifier diode D1, a choke coil L, a free-running diode D2, an output capacitor Ca, and a load resistor R.

In the TTF converter, the transistors T1 and T2 are turned on and off in synchronized fashion. The TTF converter shown in FIG. 2 is a so-called hard-switching converter, which is suitable only for relatively low switching frequencies, because at high frequency the switching losses put an excessive load on the power transistors. That problem cannot be solved by making the transistors oversized or by connecting transistors in parallel. A remedy can be provided by using a turn-off relief or unloading network, which is also referred to below as a relief network.

Figure 4:
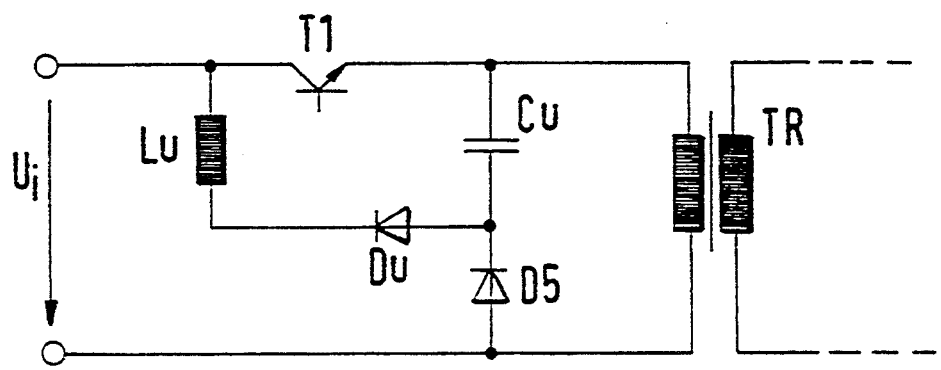
FIG. 4 is a circuit diagram of part of a direct voltage converter with a turn-off relief network in accordance with the prior art.

FIG. 4 shows a circuit connecting the primary part of a direct voltage converter to a power transistor T1, which can be inferred from German Patent DE-PS 24 43 892. A reversing or reverse oscillating capacitor Cu, a reversing or reverse oscillating diode Du, a reversing or reverse oscillating inductor or reversing inductive resistor Lu and a decoupling diode D5 are provided as the turn-off relief network. In this circuit configuration, however, the power transistor T1 is loaded by the reversing current of the relief network. In principle, the known relief network, by redundance, can also be used for converters with a plurality of power transistors. However, the total expense is relatively high.

The invention proposes controlling a reversing current of a relief network with a separate switch, namely an auxiliary transistor, rather than with a power transistor. Constructing the relief network in this way has an advantage, even in a converter configuration with only a single power transistor, because the power transistor is relieved from the reversing current. The use of the relief network in a two-transistor converter is especially advantageous, because then both power transistors can be protected with a single relief network, thus economizing on a number of components. The savings are comparable for other multi-transistor converters.

Figure 5:
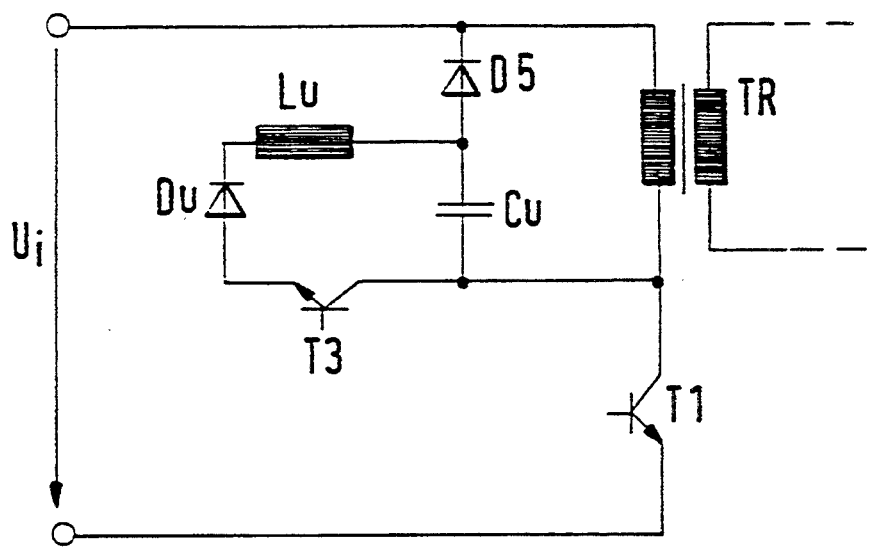
FIG. 5 is a circuit diagram of part of a direct voltage converter with a turn-off relief network according to the invention.

FIG. 5 shows a primary part of a direct voltage converter with the transformer TR and the power transistor T1. The power transistor T1 is connected in series with a primary winding of the transformer TR. An intermediate circuit voltage Ui is applied to the series circuit. A series first circuit of a reversing capacitor Cu and a decoupling diode D5 is connected parallel to the primary winding. Beginning at a junction between the reversing capacitor Cu and the decoupling diode D5, a second series circuit of a reversing inductor Lu, a reversing diode Du and another transistor T3, which is also referred to as an auxiliary transistor, is connected parallel to the reversing capacitor Cu. Components having the same function are provided with the same reference numerals in the other drawing figures as well.

The additionally required auxiliary transistor T3 is a very small component with a negligibly low power loss. The transistor T3 can be switched simultaneously with or independently of the transistor T1, as will be explained below for a two-transistor converter.

Figure 3:
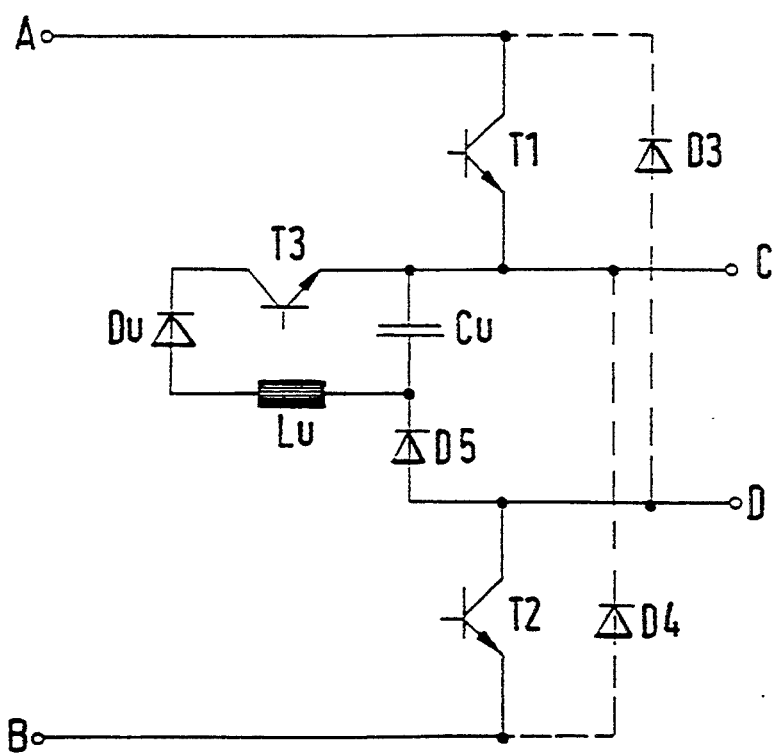
FIG. 3 is a circuit diagram of turn-off relief network according to the invention in a configuration with two power transistors.

FIG. 3 shows a configuration of the relief network according to the invention in a circuit portion of a basic circuit of the TTF converter shown in FIG. 2, with the circuit portion being indicated with the terminal points A-D. It can be seen that two power transistors T1, T2 are protected by a common relief network having the components Du, Lu, Cu and T3, and that only one decoupling diode D5 is required.

The auxiliary transistor T3 can be turned on and off jointly with the power transistors T1 and T2. However, it may also be provided with its own driver circuit and be turned on and off at other times than the power transistors T1 and T2.

Figure 11:
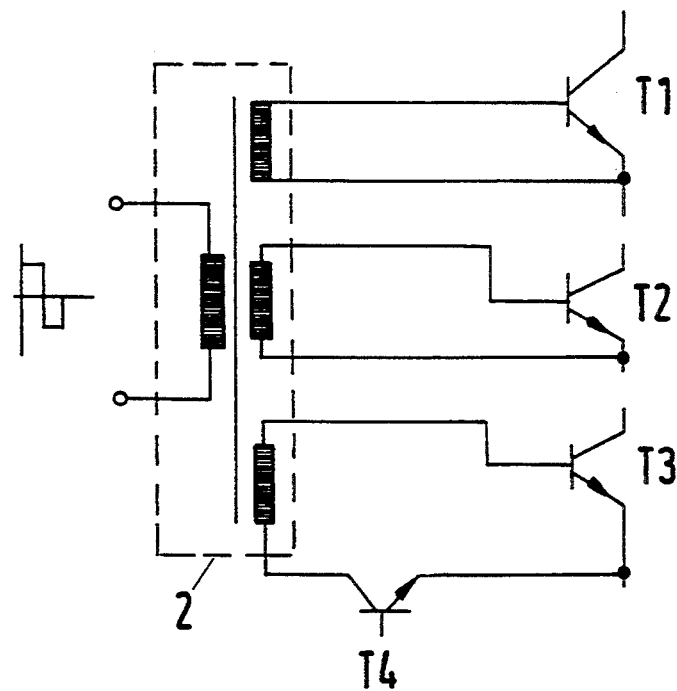
FIG. 11 is a circuit diagram of a trigger configuration.

By suitable triggering of the auxiliary transistor T3, it is possible to ensure that the auxiliary transistor T3 will not turn off at a very low pulse-to-interval ratio, such as in the event of creep or a short circuit. Security against creep or short-circuiting can thus be attained. A suitable circuit configuration for triggering the auxiliary transistor T3 is shown in FIG. 11. In this configuration, the power transistors T1 and T2 and the auxiliary transistor T3 are controlled through separate secondary windings of a trigger transmitter 2. The connection of the auxiliary transistor T3 to one of the secondary windings is performed with the interposition of a signal transistor T4.

Figure 10:
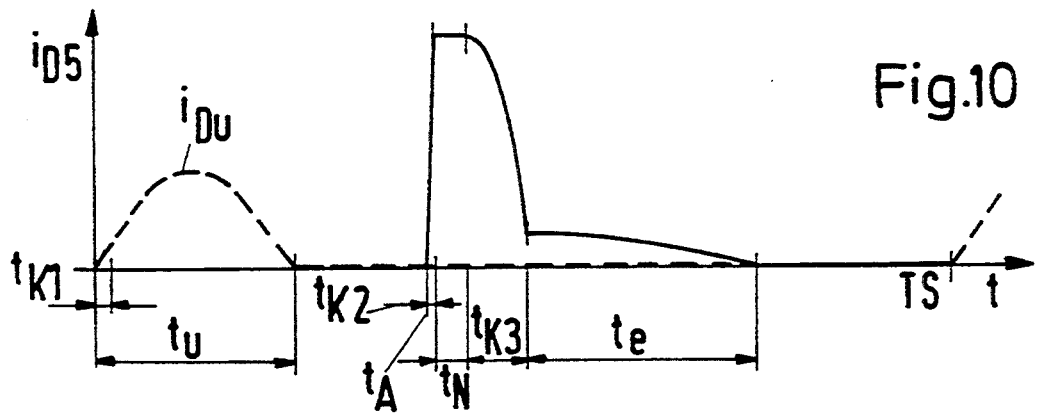

The signal transistor T4 blocks whenever the pulse-to-interval ratio is less than tu/TS, as is seen in FIG. 10.

The relief network of FIG. 3 may be constructed in such a way that after the turn-off of the power transistors T1 and T2, the turn-off losses become quite low, but the voltage at the reversing capacitor Cu reaches the value of the intermediate circuit voltage Ui after a short time. The decoupling or demagnetizing diodes D3 and D4 then become conducting and the decoupling diode D5 blocks. The auxiliary transistor T3 can already be turned on again at that moment, as a result of which the reversal takes place. This has the advantage of causing the power transistors T1, T2 (if bipolar transistors or IGBTs are used) to switch upon a voltage at the transistor of approximately 0 V, so that no turn-on losses occur.

It should be noted that because the demagnetizing diodes D3 and D4 remain in the circuit, blocking-state voltages at the power transistors T1 and T2 are limited at the top in a defined manner, specifically to the value of the intermediate circuit voltage Ui. This can be taken into account in selecting a safety margin for the allowable blocking-state voltage of the transistors T1 and T2. However, the demagnetizing time of the transformer will be prolonged slightly if the diodes D3 and D4 remain in the circuit. However, this is no disadvantage because the demagnetizing energy of the transformer TR can be used regeneratively to supply the load, thereby reducing the switchover time of the transistors T1, T2.

An additional saturable small inductive resistor may be connected in series with the reversing inductor Lu, which may be advantageous in the recovery performance of the reversing diode Du.

It should also be noted that non-illustrated Zener diodes can additionally be connected in series with the demagnetizing diodes D3, D4. The advantage of such a configuration is that the demagnetization of the transformer TR takes place with a higher voltage, and accordingly the demagnetization is concluded in a shorter time. The Zener diodes also assure equality of the voltage time cross sections.

Figure 1:
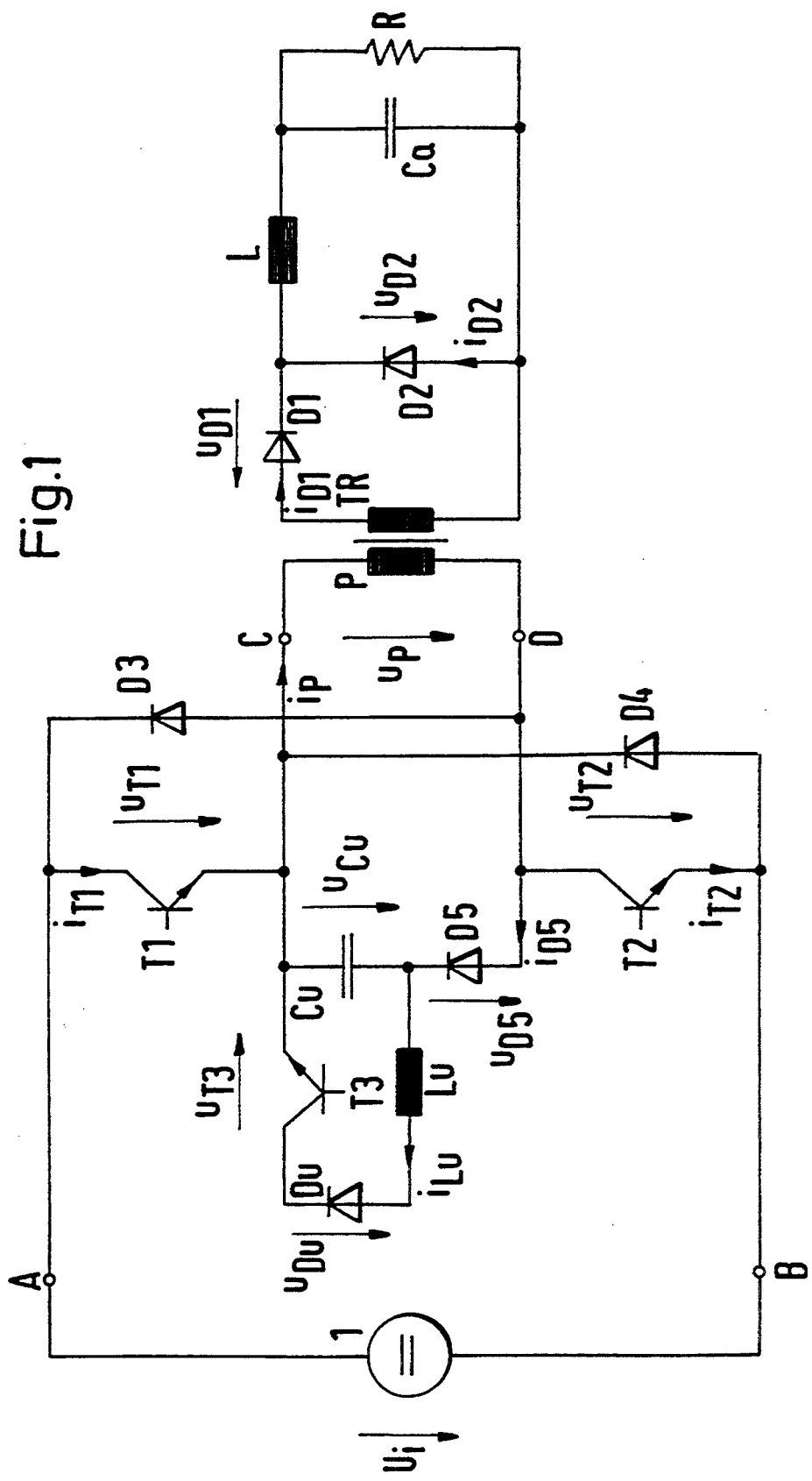
FIG. 1 is a schematic circuit diagram of a two-transistor flux (TTF) converter circuit with a turn-off relief network.

FIG. 1 shows the use of the circuit portion shown in FIG. 3, in a two-transistor flux converter circuit, that is shown as a basic circuit in FIG. 2. In the complete circuit of FIG. 1, idealized components are assumed. A functional description which follows, refers to this circuit.

Figure 6:
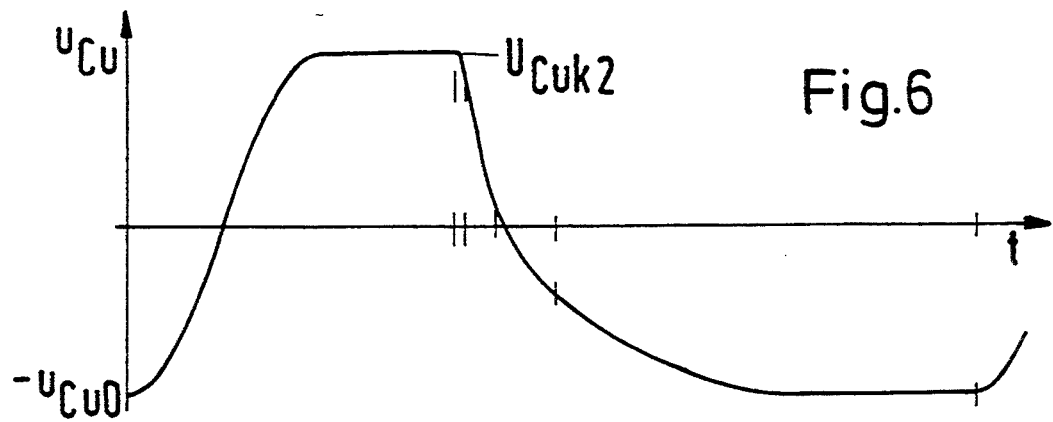

FIG. 1 shows current and voltage arrows that are necessary for purposes of explanation. The current and voltage courses of various currents and voltages are shown in FIGS. 6–10. The function description for the steady state begins at a time t=0, when the three transistors T1, T2 and T3 have been turned on (that is, the triggering is effected with a common driver circuit) and ends at a time t=TS, where TS is the switching period. At the time t=0, the voltage uCu(t) at the reversing capacitor Cu is set as uCu(t=0)=−UCuO, which is quantitatively less than or equal to the amount of the intermediate circuit voltage Ui, as is seen in FIG. 6. The times t that are mentioned can each be seen in FIG. 10.

Figure 7:
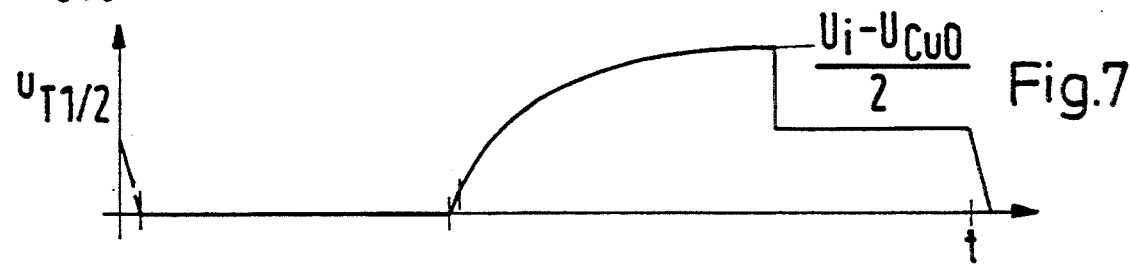
Figure 8:
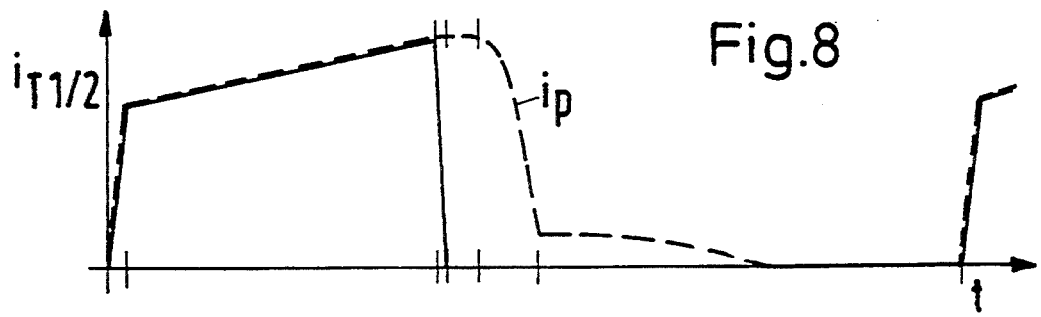

Once the power transistors T1 and T2 have been turned on, the load current commutates from the diode D2 to the diode D1 until, at a time t=tk, the current through the diode D2 amounts to iD2(t=tk1)=0, as is seen in FIG. 9. At the same time, as the result of the closure of the auxiliary transistor T3, the load of the reversing capacitor Cu reverses in sinusoidal form through the reversing inductor Lu, until at a time t=tu, the reversing current resumes the value of 0, as is seen by the course of iDu in FIG. 10. At a turn-off time t=tA, the transistors T1, T2 and T3 are turned off again. If the voltage uP(t) at the primary winding P attains the value of the capacitor voltage, that is, up(t-)=UCuU, the reversing capacitor Cu becomes operative as a voltage source. The current through the two power transistors T1 and T2 commutates over the branch including the reversing capacitor Cu and the diode D5. The current iP(t) in the primary winding P remains virtually unaffected by this commutation, which proceeds very quickly. As is seen in FIG. 7, the voltages at the two power transistors T1 and T2 take on the difference between the intermediate circuit voltage Ui and the reversing capacitor voltage UCu. This commutation is ended after the time t=tk2, once the currents through T1 and T2 become 0, as is seen in FIG. 8.

The further course over time of the current iP(t) and therefore of the currents iD1(t) and iD2(t) is then determined by the reversing capacitor Cu. The load circuit then acts approximately like a constant current source, which linearly discharges the reversing capacitor Cu. Moreover, an oscillation with a characteristic circuit frequency that is composed of the primary and stray transformer inductance, is superimposed on the parasitic inductive resistances of the primary circuit and of the reversing capacitor Cu.

After a time t=tN, or in other words after the recharging phase, once the voltage at the diode D2 drops below the value of the on-state voltage, the diode D2 becomes conducting. The load current commutates by cosine and sine functions from diode D1 to diode D2, until after a time t=tk3, the current iD2(t=Tk3) attains the value of the load current, as is seen in FIG. 9.

The load circuit is then disconnected from the primary circuit. As the process continues, the transformer TR is demagnetized. If uCu(t) does not attain the value of the intermediate circuit voltage Ui, then the two demagnetization diodes remain inoperative. The total magnetization energy of the transformer, the primary-side parasitic inductive resistances and stray inductive resistance of the transformer, is then located as a charge in the reversing capacitor cu, which is fed to the load circuit in the next switching cycle.

Once the voltage uCu(t) at the capacitor Cu attains the value of the intermediate circuit voltage Ui, the diodes D3 and D4 become conducting. The remaining magnetization energy still contained in the transformer is fed back into the intermediate circuit.

FIGS. 6–10 show the case in which the demagnetizing diodes D3 and D4 do not become conducting.

If the demagnetizing diodes D3 and D4 are not present, then the voltage uCu(t) can assume higher values than the amount of the intermediate circuit voltage. In that case, the demagnetization of the transformer proceeds faster. However, the power transistors are loaded by higher blocking-state voltages.

If the demagnetization of the transformer is concluded, after the demagnetization time t=te, or if the diodes D3 and D4 become conducting, then the diode D5 blocks, and the reversing capacitor Cu remains charged to the negative voltage which is then attained, that is uCu(t=te)=-UCu0.

The blocking-state voltages at the two power transistors T1 and T2 attain their maximum value in this switching interval.

Once the transformer is demagnetized, no oscillation processes whatever proceed on the primary side, given ideal components. The blocking-state voltages at the transistors T1 and T2 decrease to the level of half the intermediate circuit voltage, as is also the case for the TTF converter without the relief network (uP(t)=0). At the diode D5, the voltage of the reversing capacitor Cu is present as a blocking-state voltage. The power transistors T1 and T2 can then be turned on again.

We claim:

1. A turn-off relief network for a direct voltage converter, comprising a transformer having a primary winding; at least one clocked power transistor connected in series with said primary winding; a first series circuit connected parallel to said primary winding, said first series circuit consisting of a series connection of a diode and a capacitor; and a second series circuit connected parallel to said capacitor, said second series circuit consisting of a series connection composed of a reversing inductor, a reversing diode for blocking a reverse capacitor voltage and an auxiliary transistor.

2. The turn-off relief network according to claim 1, wherein said at least one power transistor includes first and second power transistors connected in series with said primary winding in a two-transistor converter configuration of the direct voltage converter; and said second series circuit acts as a relief network being common to said first and second power transistors.

3. The turn-off relief network according to claim 2, wherein said primary winding is connected between said first and second power transistors.

4. The turn-off relief network according to claim 1, including a signal transistor through which said other transistor is triggered, said signal transistor blocking triggering of said other transistor in the event of an open or short circuit, when an adjustable pulse-to-interval ratio fails to be attained.

5. A turn-off relief network for a two-transistor direct voltage converter, comprising a transformer having a primary winding; first and second clocked power transistors; said first power transistor, said primary winding and said second power transistor forming a first series circuit; a second series circuit connected in parallel to said primary winding, said second series circuit consisting of a series connected diode and a capacitor; and a third series circuit connected in parallel to said capacitor and forming a relief network common to said first and second power transistors, said third series circuit consisting of a series connection of a reversing inductor, a reversing diode for blocking a reverse capacitor voltage and an auxiliary transistor.

6. A turn-off relief network for a direct voltage converter, comprising a transformer having a primary winding; at least one clocked power transistor connected in series with said primary winding; a first series circuit connected parallel to said primary winding, said first series circuit consisting of a diode and a capacitor; and a second series circuit connected parallel to said capacitor, said second series circuit essentially consisting of a reversing inductor, a reversing diode for blocking a reverse capacitor voltage and an auxiliary transistor.

* * * * *